April 29, 1969  R B PARNELL  3,441,101
VEHICLE COMPRISING FRONT WHEEL DRIVE AND TRAILER
Filed Nov. 16, 1966
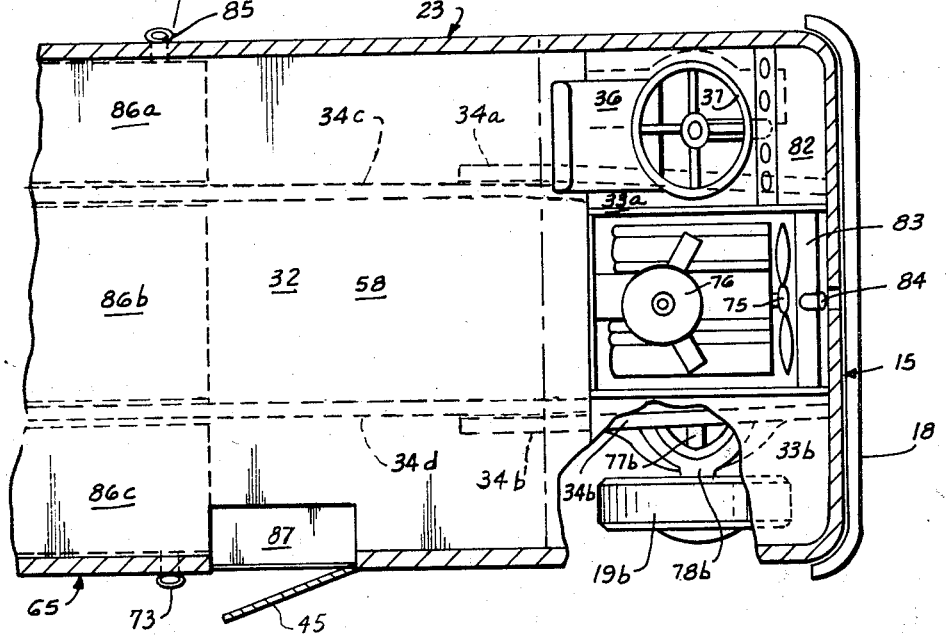
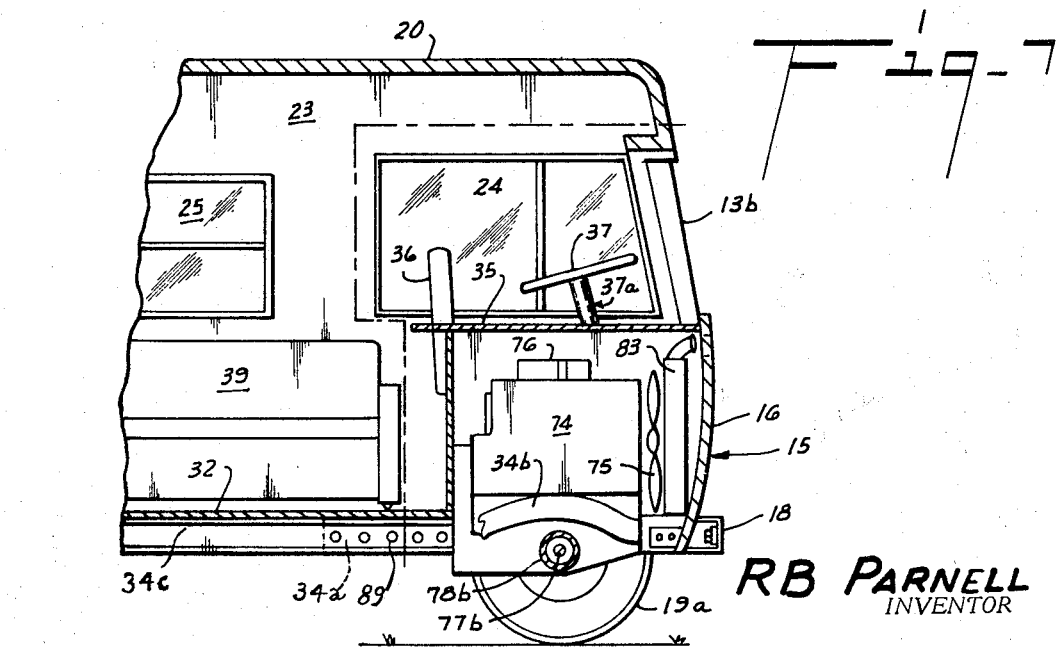
RB PARNELL
INVENTOR
BY Wm. E. Ford
ATTORNEY

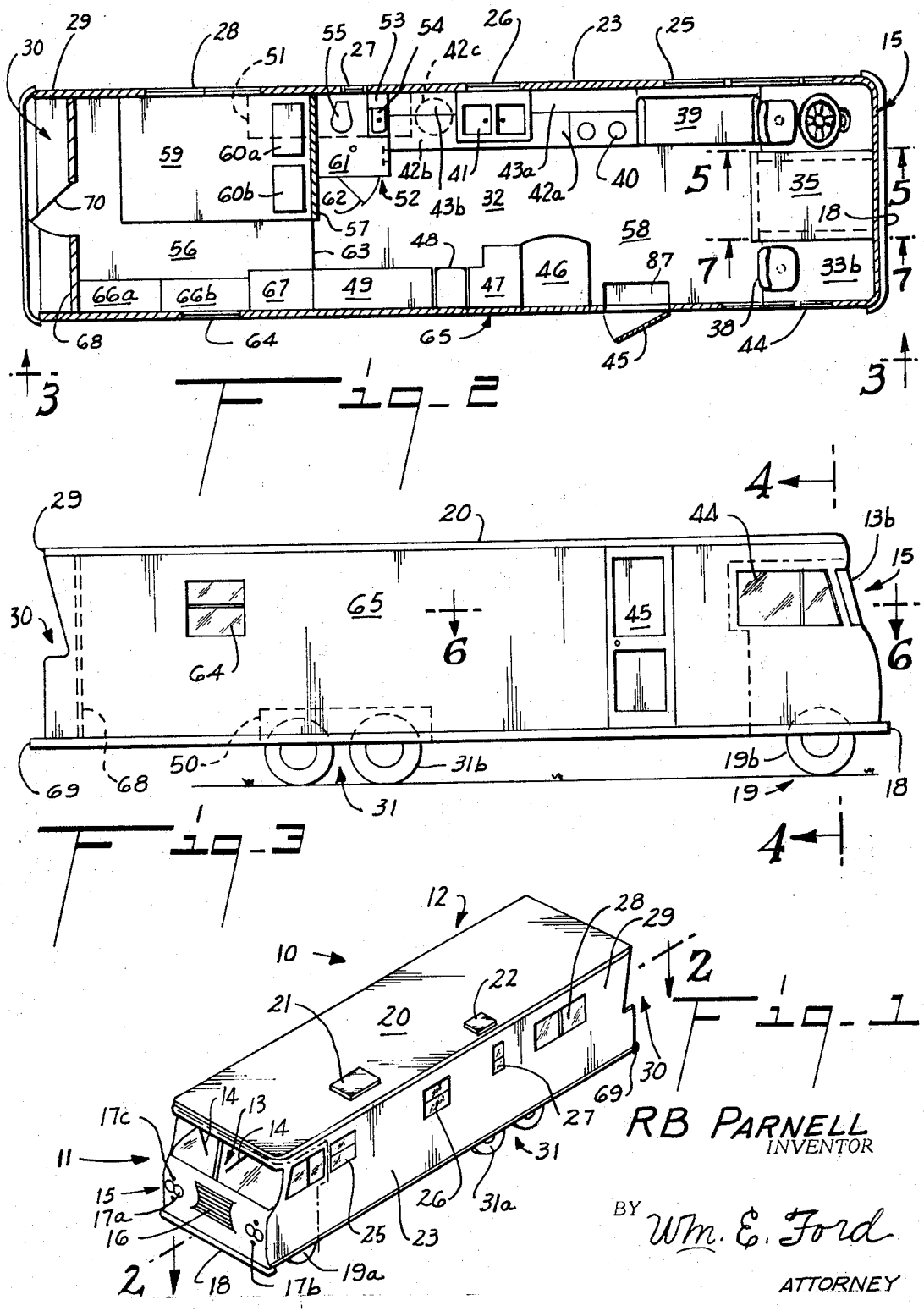

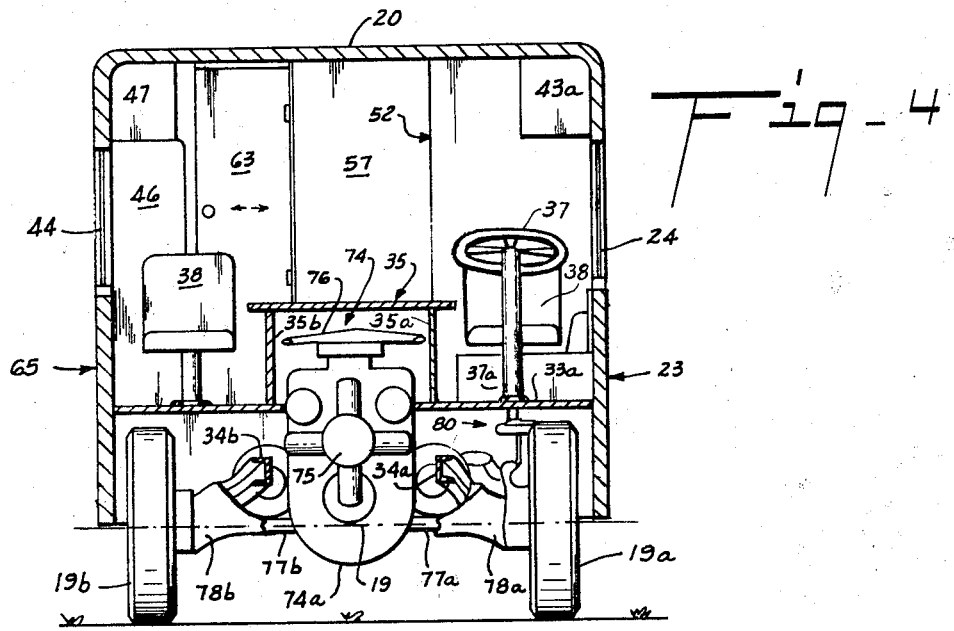
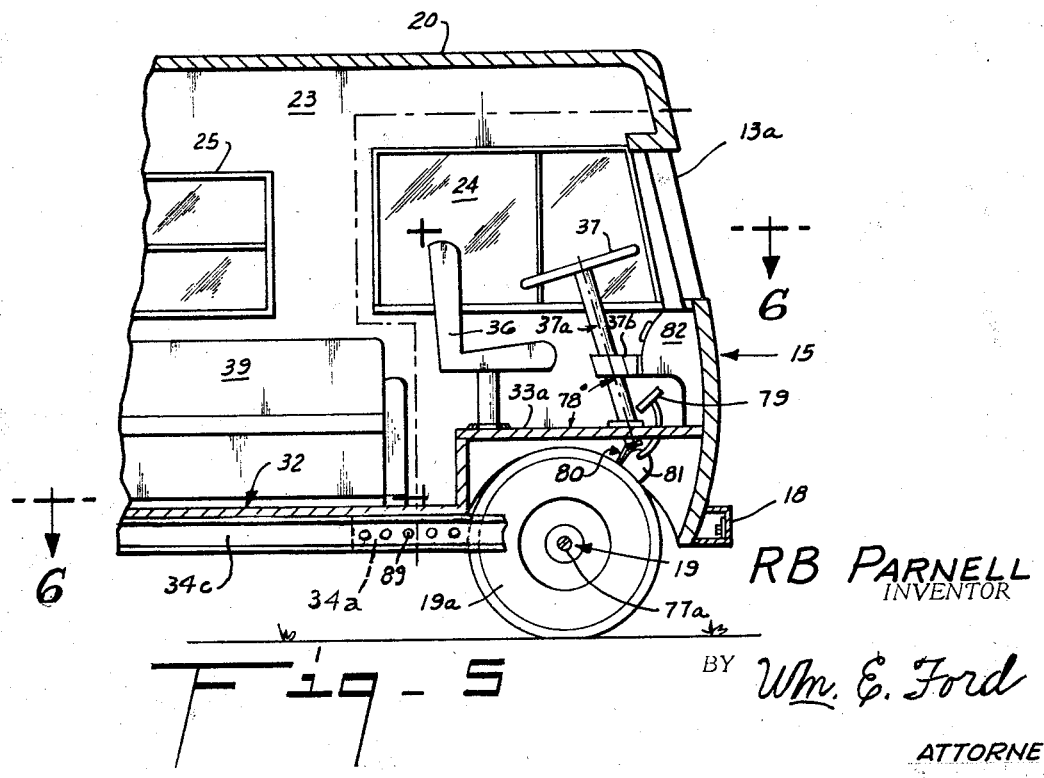

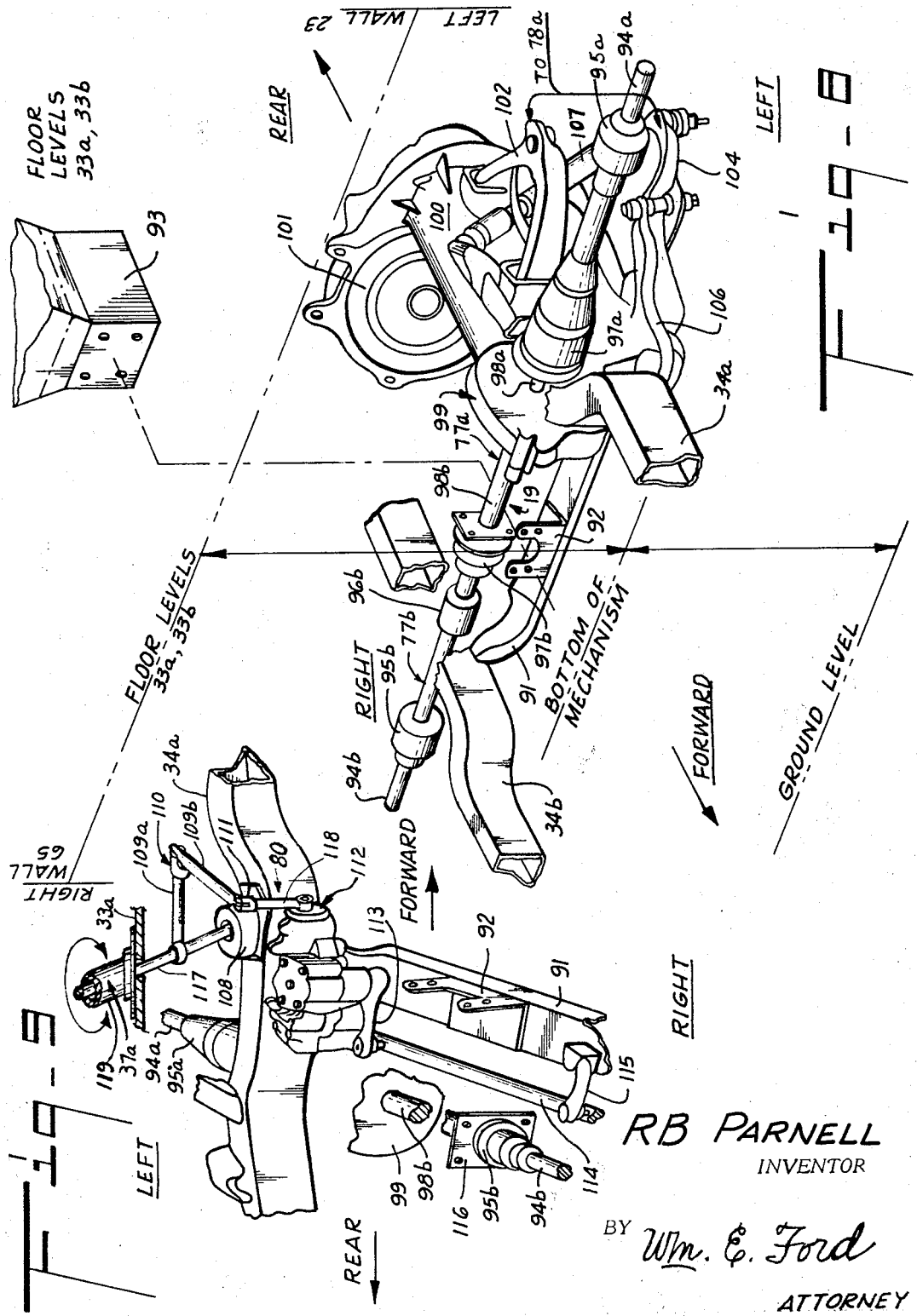

United States Patent Office 3,441,101
Patented Apr. 29, 1969

3,441,101
VEHICLE COMPRISING FRONT WHEEL DRIVE AND TRAILER
R B Parnell, 1002 Ave. D, South Houston, Tex. 77587
Filed Nov. 16, 1966, Ser. No. 594,905
Int. Cl. B60p 3/00, 3/36; B62d 21/18
U.S. Cl. 180—12                10 Claims

ABSTRACT OF THE DISCLOSURE

This trailer home invention includes a floored bow portion and a lower floored housekeeping portion, with forward axle supported bow frame supporting engine motor, also motor driven axle drive means, steering wheel and seat. The floored housekeeping portion includes a rear axle supported rear frame supporting a main chassis. The bow and rear portions are separately fabricated and assembled and then joined together at location from which the trailer home may be driven away.

---

This invention relates to an assembled unitary vehicle which includes a front wheel drive portion and a housekeeping portion supported on its own rear wheeled axle means, whereby housekeeping appurtenances, fixtures and compartments are carried above a substantially single floor level while the housekeeping portion is adapted for facile assembly with the front wheel drive portion to complete the vehicle.

It is a primary object of the invention to provide a unitary, home trailer or motorized habitation, with housekeeping accouterments supported at substantially a single floor level on a rear portion supported on a rear wheeled axle means, the rear portion being adapted for structural connection with a forward, front wheel drive portion to complete the assembly.

It is another object of the invention a motorized habitation of this class which is adapted to provide a forward front wheel drive portion and a housekeeping, rear wheeled axle supported portion connectable in manner that the habitation may be entered by a single forward side door for access to engine, driver and housekeeping area within a single enclosure.

It is also an object of this invention to provide a motorized habitation of this class which, through utilization of a front wheel drive, enables a disposition of housekeeping accouterments and engine, driver's seat and steering wheel accessible from substantially a single floor level.

It is yet a further object of the invention to provide a motorized habitat of this class utilizing an assembly of front wheel drive unit and housekeeping chassis in manner that the front wheel drive engine does not interrupt the single floor level arrangement to the rear thereof, the engine also being at a level it may be stepped over, or at a level to permit it to be covered by a table top.

It is still another object of the invention to provide a motorized habitat of this class whereby the use of front wheel drive forward portion enables the provision of a housekeeping portion rearwardly of the engine within legal length limits which allows a side and a rear door and also disposition of furniture, stove, sink, refrigerator, toilet, shower, bed space, compartmenting shelving, and storage, all supported from substantially a single floor level.

It is also a further object of the invention to provide a motorized habitat of this class which enables all housekeeping accouterments to be disposed at a single floor level while providing a slightly modified front wheel drive under a floor level only one step higher, the front wheel drive thus requiring a minimum of changes in order to occupy slightly less headroom.

It is yet a further object of the invention to provide a motorized habitat of this class in which only a slightly modified, conventional front wheel drive mechanism may be used, requiring that the steering wheel post extend, from its lowermost end, from substantially upright positions to positions not substantially greater than twenty degrees rearwardly of the vertical.

Other and further objects will be apparent when the specification herein is considered in connection with the drawings, in which:

FIG. 1 is an isometric view of the front, top and left side of a front wheel drive trailer home embodying a form of the invention;

FIG. 2 is a sectional plan view, taken along line 2—2 of FIG. 1, showing floor space distribution to various features;

FIG. 3 is a right side elevation taken along line 3—3 of FIG. 2;

FIG. 4 is a transverse sectional elevation, looking rearwardly, as taken along line 4—4 of FIG. 3;

FIG. 5 is a fragmentary, longitudinal sectional elevation, looking forwardly as taken along line 5—5 of FIG. 2;

FIG. 6 is a fragmentary sectional plan view, taken along line 6—6 of FIG. 5;

FIG. 7 is a fragmentary, longitudinal sectional elevation, looking inwardly as taken along line 7—7 of FIG. 2;

FIG. 8 is an isometric view showing essential parts relationships of a typical front wheel drive system, as viewed looking downwardly from the front and left side thereof; and FIG. 9 is an isometric view of essential parts relationships of a typical front wheel drive system of the type shown in FIG. 8, as viewed looking downwardly from the front and right side thereof.

Referring now in detail to the drawings in which like reference numerals are applied to like elements in the various views, a vehicle which may be termed a front wheel drive trailer home 10 is shown in FIG. 1 comprised of a front wheel drive forward section or bow 11 and a rear or housekeeping section 12, the two sections being shown separated diagrammatically by a heavy phantom line defining the line of division along which the two sections are adjoined to complete the trailer home 10.

The forward section 11 is shown as disclosing a front 15 having left and right windshields 13a, 13b across the whole upper part thereof with respective windshield wiper 14a, 14b, being indicated therefor, the windshield being coverable by shades, not shown as drawn on the inside. Below the windshields 13a, 13b, the forward or bow section 11 of the trailer home 10 is flared or streamlined outwardly and downwardly and has a radiator grill 16 shown centrally thereof. Headlights 17a, parking lights 17b, and signal lights 17c are provided in the bow section 11, of the radiator grill 16. Also the front bumper 18 of the vehicle is disclosed in FIG. 1 and the tire of the left front wheel 19a.

A top or roof 20 of the vehicle is disposed over the housekeeping section 12, and to overextend the bow section 11. The roof 20 is shown as having a vent or sheltered outlet 21, to vent gases and smoke, as from above the stove, not shown in FIG. 1, but to be hereinbelow described. Also a conventional bathroom vent 22 is shown in the top 20. Also, the left side wall 23 of the vehicle, as shown in FIG. 1, has therein successively from front to rear a driver's side view window 24, a living room window 25, a sink window 26, a bathroom window 27, and a bedroom window 28.

Additionally, the vehicle 10 is shown in FIG. 1 discloses on the left side 23 thereof the side contour 29 of the rear entry 30 into the vehicle housekeeping section 12; and also may be seen the tires of the left wheels 31a of the tandem unit 31 which comprises the rear wheeled support of the vehicle.

Now taking up FIG. 1 and 3 in the relation to the sectional plan view of FIG. 2 which shows the overall floor plan arrangement of the vehicle in best detail, the housekeeping section floor 32 is indicated as being disposed all at a single level, while the front wheel drive section floor 33a, 33b forwardly thereof need be at a level no more than one step higher when a skillfully designed front wheel drive arrangement is employed having taken up relatively small headroom.

As best indicated in FIG. 4, frame elements 34a, 34b supported by the front wheel axle housing 78a, 78b, in turn support the floor sections 33a, 33b, as will be further set forth hereinbelow. A table 35 is shown in FIG. 2 between the floor sections 33a and 33b and covers the conventional front wheel drive engine.

A swingable driver's seat 36 is indicated to the left of the table 35 and forward thereof a steering wheel 37 is provided. Also, a swingable seat 38 is provided to the right of the table 35, which can thus face forwardly or rearwardly or toward the table 35, as at meals for the person who faces across the table the person who swings the driver's seat 36 toward the table.

To the rear of the forward section 11, the floor 32 supports, on the left side, successively from front to rear a sofa or divan 39, a stove 40, and a sink 41, with a drainboard 42a, 42b on either side of the sink, and cupboards 43a, 43b thereabove. Oppositely, on the right side 65 of the vehicle, from front to rear, a right side view window 44 and a main entrance door 45 are provided in the right side 65 of the vehicle, and to the rear thereof the floor 32 supports successively a refrigerator 46, a storage cabinet 47, and provides room for a furnace or heating means 48 to the rear of the cabinet 47. Also, above the right wheels 31b of the tandem unit 31, which provides the vehicle rear wheel support, a closet 49 is indicated in FIG. 2 which is built over the right wheel well 50 indicated in dotted lines in FIG. 3.

The left wheel well 51 is indicated in dotted lines in FIG. 2; the rear portion of the rear drainboard 42b being disposed over the forward portion of the wheel well, and immediately to the rear of the forward wall of a bathroom 52, to the rear of the drainboard 42b, a small bathroom medicine cabinet 53 and lavatory 54 are disposed above the left wheel well 51. Then rearwardly, above the recessed central portion of the left wheel well 51, between the left wheels of the tandem 31, a commode 55 is located.

Space transversely inwardly of the bathroom 52 is provided to serve as an access passage of the bathroom 52 and also to serve as a shower room 61, the disposition of the conventional shower drain and hot and cold water sprays being indicated (without reference numerals and lead lines), in the shower room 61, and a door 62 being shown giving access into the shower room as indicated in FIG. 2.

A transverse division wall 57, which divides the bedroom 56 to the rear from the bathroom 52 and living room space 58 forwardly thereof, extends above the left wheel well 51, the rearward portion of the wheel well having a bed 59 disposed thereabove in the bedroom 56, the head of the bed, as indicated by the pillows 60a, 60b, being against the division wall 57.

A closet 49 is provided against the right side wall 65 of the vehicle, and is accessible to the living room space 58 just forward of the division wall 57. Also a closet 67 is provided on the right side just to the rear of the division wall 57 to comprise the right forward corner of the bedroom 56. To the rear of the closet 49, chests 66b and 66a are provided in the bedroom 56, to extend up to the height of the sill of the right bedroom window 64. The chest 67a is disposed just forward of a rear transverse wall 68 which divides the bedroom 56 from the rear entry 30. To the rear of the rear entry 30 a rear bumper 69 is shown in FIGS. 1, 2 and 3. A rear entrance door 70 is provided in the bedroom rear wall 68 forward of the rear entry 70, and a door 63 in the division wall 57, adjacent the closet 49, separates the living room 58 from the bedroom 56.

The disposition of a front wheel drive unit with relation to the disposition of the other parts of the vehicle, especially in elevation, is a primary concept on which the invention has been predicated. Since front wheel drive units of several different types can serve, no particular make of front wheel drive is shown in the drawings. Rather, since the cooperation of parts in all of these drives is conventional, the parts of front wheel drive elements, as shown in FIGS. 4–9, inclusive, are only shown in regard to their general cooperation with chassis, frame, and engine structure, and to demonstrate their space occupying aspects, and with no effort being made to trace through the lengthy and intricate cooperation of elements entering into a front wheel drive.

In the transverse sectional elevational view of FIG. 4, indicated in part diagrammatically, a front wheel drive engine assembly 74 is shown, with fan 75 projected in front thereof, and air filter 76 on top of the engine block. Notably, the engine block 74 at base extends only a few inches below the right and left axle elements 77a, 77b visible in the sectional view, while the total headroom between the bottom of the engine block 74a and top of the air filter 76 amounts to no more than approximately 40 percent of the total height of the vehicle. This disposition of the engine block 74a in elevation permits ample clearance between the engine block and the ground, while the table top 35 can be installed with slight clearance above the air filter shown as comprising the uppermost engine assembly part. This results in a table top disposed at adequate height above the level of the floors 33a, 33b, so that two persons seated in the swivel seats 36, 38 may swivel these seats to face inboard, whereby they may eat comfortably from the top of the table 35. Also this table height is at such an elevation above the floor 32, that two persons seated on slightly high bottom chairs or comfortable stools may eat from the rear portion of the table 35.

As indicated partially diagrammatically in FIG. 4, the front wheel axles 77a, 77b extend below the respective frame elements 34a, 34b and are journalled in journal providing means, not shown, but supported by the frame elements 34a, 34b, and occluded by, and to the rear of the forward shells of frame included housing members 78a, 78b. As journally supported the tire equipped wheels 19a, 19b rotate with the respective axles 17a, 17b, as the wheels 19a, 19b in turn support the axles 17a, 17b, in conventional manner.

Now considering FIGS. 4–7, inclusive, steering wheel post 37a is indicated as being at an angle to the vertical of approximately 12 degrees, this angle being substantially less than the conventional angle from the vertical at which conventional steering wheels in corresponding usages slant rearwardly, such being necessary in order to position the driver's seat 36 as far forwardly as possible, thus to allow the main floor level 32 to extend as far forwardly as possible toward the front of the vehicle. In practice, for different designs, the steering wheel post assembly may extend substantially vertically, or the steering wheel post assembly may slope rearwardly in other designs as much as 20 degrees from the vertical.

Also in FIGS. 4 and 5 steering mechanism generally designated by the reference numeral 80 is indicated under the floor 33a, extending downwardly from the lower end of the steering wheel post 37a. Additionally, in FIG. 5 a brace or bracket 37b is shown extending rearwardly from the instrument panel 82 to brace the steering wheel post 37a. Also a conventional brake pedal 79 is shown to indicate the location of brake application to a conventional front and rear wheel braking system 81.

A conventional radiator 83 is shown conventionally disposed forwardly of the fan 75 to be filled with water through an inlet 84 through the front 15 of the vehicle. Also, a water inlet 85 may be provided into a water compartment 86a beneath the floor 32, between the lowermost part of the left side wall 23 and the left longitudinal beam 34c which connects the forward frame 34 to the frame parts to the rear, not shown, but which are connected to be supported by the frame parts of the tandem unit 31 indicated in FIG. 1.

Also a sewage compartment 86b, may be provided between the left longitudinal beam 34c and the aforesaid right longitudinal beam 34d, and connected to take sewage and water from the toilet hereinabove described. Also a conventional means, not shown, is provided for drainage connection from the compartment 86b.

Also, between the lowermost part of the right side wall 65 and the right longitudinal beam 34d which connects the forward frame 34 to the tandem unit frame parts to the rear, not shown, a gasoline compartment 86c may be provided, with a conventional fill cap access 73 thereinto, as indicated in FIG. 6.

The rear support 35c for the table 35 may be disposed to upstand from the floor 32 forwardly just to the rear of the engine 74, thus to be overhung by the table 35, as indicated in FIG. 7, to provide room for the two persons to be seated at the rear end of the table and put their feet under the table; and in like manner the table left side support 35a, and the table right side support 35b are disposed to extend upwardly from the respective floors 33a, 33b, adjacent the engine 74, thus to be overhung by the table 35, as indicated in FIG. 4.

It should be of special notice that the vehicle 10 is comprised of two separate structural sections, namely a structural trailer or housekeeping section 12, including a rear wheel tandem unit 31, and a forward, bow or front wheel drive section 11. The chassis or housekeeping trailer section 12 with the tandem unit 31, may be made and equipped as by a local fabricator while the front wheel drive section 11 may be standardized upon and supplied by a manufacturer of automobile drives or assemblies of automobile parts.

The line of abutment or junction between the sections 11, 12 is indicated in each of FIGS. 1, 3, 5, 6 and 7 in phantom lines; the junctions being abutted and the seams covered over by the best shop practices so as not to be easily discernible. Mechanically and structurally the forward, bow, or drive section 11 includes the aforesaid frame members 34a, 34b which are rivet connected along their rearward portions respectively to the forward portions of the trailer frame members 34c, 34d. See FIGS. 5 and 7.

A conventional front wheel drive assembly 90 is shown in the isometric views of FIGS. 8 and 9, not with a view of disclosing the elaborate and detailed cooperation of the many separate elements and parts which together comprise a typical front wheel drive, but rather with the object of disclosing the positions taken by the most salient parts and sub-assemblies thereof in three-dimensional relationship. In this regard reference is made to the 1966 Oldsmobile Chassis Service Manual which will be established in relationship to this application after it has received a serial number and filing date.

This manual is 2 9/16" thick, and contains over 1000 pages, with many pictorial illustrations, diagrams, and sketches, many comprising prior art as to the constituency of front wheel drives, and the details shown in FIGS. 8 and 9 illustrate generally the disposition of the front wheel drive sub-assemblies and salient parts, as adapted in limited space, to provide a front wheel drive for a trailer home of the type shown in FIGS. 1-7, inclusive.

The frame elements or members 34a, 34b support the chassis parts of the drive section or bow 11. Also, these frame elements or members 34a, 34b carry the forward axle assembly 19, which is driven by the front wheel drive assembly 90, the rotated left and right front wheels 19a, 19b with their tires supplying ground contact, the tires being those specific parts conventionally driven along the ground to move the motorized trailer home 10. In FIG. 8 the left and right main frame members 34a, 34b are shown tied together by a frame cross-tie 91, forward of the transverse axis of the forward axle 19, and centrally of the cross-tie 91 there is mounted the motor support bracket 92, the lower portion of the motor 93 of the engine assembly 74 is mounted on the cross-tie 91 with its forward face bolted to the bracket 92, as indicated in FIG. 8, the motor 93 not being shown in FIG. 9 for purposes of clarity.

The forward axle or forward axle assembly 19 is shown in FIG. 8 in its relative position to the rear of, and with relation to the motor bracket 92, as comprising successively, as followed from end to end, to right axle end portion 94b, on which the right wheel, not shown in FIG. 8, is mounted to support the right axle assembly 77b. This right axle assembly 77b further includes, successively inwardly, a right outer joint 95b, a torsional damper 96b, a right inner joint 97b, and a right output shaft 98b which is connected to transmit drive from a differential 99.

The left axle assembly 77a, also indicated in FIG. 8 as being driven by the differential 99, includes successively outwardly from the left output shaft 98a, (connected immediately to be driven from the differential 99): first, a left inner joint 97a, then, an outer left drive joint 95a, and outermost, a left axle end portion 94a on which the left wheel, not shown, is mounted to support the left axle assembly 77a. The transmission housing 100, which houses the mechanism which drives the parts within the differential 99; extends rearwardly from the differential 99; drive connection between the engine and the housed transmission parts being shown provided by a torque converter 101 shown in FIG. 8 as disposed inwardly and rearwardly of the transmission housing 100.

FIG. 8 also shows, respectively, above and below the left drive joint 95a, an upper control arm 102 with upper ball joint 103 in connected relation therewith and a lower control arm 104 with lower ball joint 105 in connected relation therewith; the control arms 102, 104 extending from the frame member 34a as indicated. Also a stabilizer shaft 106 and its connected elements and a shock absorber 107 and its connected elements are shown in FIG. 8.

In the isometric view of FIG. 9 the steering post assembly 37a, described hereinabove as connected to the steering assembly 80 is shown as having its outer member or column 119 terminated at the floor 35a. Within the column 119 the steering post rod 117 extends therethrough and further downwardly to terminate in a collar, not shown, within a bearing collar 108 on the left frame 34a. The steering assembly 80 includes a universal joint arm 109a which is rigidly connected at one end to the steering rod 117 while the other end of the arm 109a forms a first part of a universal joint 110, the second part of the universal joint 110 comprises an end part of a universal joint arm 109b, the arm 109b being pivotally connected at its other end to form a pivot joint 111 with a radius arm 118 which is connected into, and transmits steering motion to, the steering gear assembly 112.

In FIG. 9 a pitman arm 113 is indicated as taking steering motion from the steering gear assembly 112, the pitman arm 113 being connected, by a vertical pivot pin included thereby, to a conventional relay rod 114. The ends of the relay rod 114 are not shown in FIG. 9, but as is well known in practice, the respective ends of this relay rod 114 are connected to transmit turning motion to the respective left and right wheels of the vehicle, as such motion is imparted to the pitman arm 113 from the steering gear box 112. The right portion of the relay rod 114 is shown in FIG. 9 as supported by an idler arm 115, pivotally mounted forwardly of the frame cross-member 91, with a vertical pivot pin, corresponding in function with the vertical pivot pin of the pitman arm 113, connecting the idler arm 115 to the relay rod 114.

The right axle assembly 77b, shown in FIG. 8, is also shown in FIG. 9, the right outer joint 95b, inwardly of the right axle end portion 94b, being shown as including a mounting or support plate 116, not shown in FIG. 8, by which the axle assembly is connected for support by axle journal providing structure, not shown in FIGS. 8 and 9, but which is connected in function to be supported by the longitudinally extending right frame member 34b. Also, in FIG. 9, the right axle assembly 77b is shown as including the right output shaft 98b extending from the differential 99, correspondingly as shown in FIG. 8. Noticeably, in FIG. 8, the motor 93 is indicated as being bolted to the bracket 92 but is shown diagrammatically displaced from such bracket 92 for purposes of clarity.

As front wheel drive mechanisms are conventional and may vary in the three dimensional borders of space occupied, while employing in general substantially the same functional elements, this application is not belabored by a piece-by-piece disclosure and complete description of the cooperation of parts for any particular model of front wheel driven vehicle. Rather, the mechanism disclosed in FIGS. 8 and 9 may be said not to be a comprehensive front wheel drive disclosure but a disclosure in the nature of a diagrammatic representation of a front wheel drive applicable to drive a vehicle as hereinabove described in FIGS. 1–7, inclusive. As such vehicle is conceived, ample space is provided between the inner faces of the front wheels 19b, 19a, and between the floors 33b, 33a, and the ground, and centrally between the table top or engine assembly cover 35 and the ground, to provide for an engine assembly 74 and all associated mechanism for a front wheel drive to be installed in this space to drive a vehicle as hereinabove described with the delivery of a proper and adequate horsepower for the size of the vehicle.

As may be deduced from the foregoing, any changes in the way of dimensions of parts to obtain compactness over conventional models, can be effected without involving more than minor changes in the tooling of assembly lines presently set up for front wheel drive mass production. Illustrative of the results obtainable, FIG. 8 indicates GROUND LEVEL, FLOOR LEVELS 33a, 33b, the level of the BOTTOM OF MECHANISM, and the relative positions of the RIGHT WALL 65 and LEFT WALL 23 of the vehicle, with relation to the front wheel drive mechanism and the motor 93 of the engine assembly 74.

As a noticeable result of the combination of elements obtained, the axis of the steering wheel post 37a is indicated in FIG. 5 as extending at an angle of approximately twelve (12°) degrees to the rear, from bottom to top, which is at some substantial lesser angle than the angle at which conventional steering wheel post axes extend rearwardly. This angle is determined by the space limitations imposed upon conventional front wheel drives by the other requirements of the invention, and such angle is subject to variation as affected by mechanical exactments in various modifications. Thus the range of this angle for the type of vehicle involved in this invention can be from substantially vertical to approximately twenty (20°) degrees to the rear of the vertical.

The invention is subject to being carried out by various embodiments, structural combinations, and alternative arrangements. For instance, the rear wheeled axle means, may comprise a pair of opposed wheels connected by an axle journa'led in journal means or leaf springs supported by rear frame members. In effect the invention is subject to variations of salient dimensions within the range of design limitations; also it is subject to variation as to the combinations of elements involved, and as to the lines of division between the forward front wheel drive section and the rearward or housekeeping trailer section, and it is subject to further variations as to the engine cover-table construction and front left and right floors, and as to the apparatus and equipment in the housekeeping trailer section, and as to the housekeeping trailer section layout.

What is claimed is:

1. The combination of a self-propelled trailer home comprising in assembly, a forward, engine driven, portion including a forward wheeled axle, a forward frame including means providing forward journal means for said forward axle whereby said forward axle journally supports said forward frame, a bow chassis supported by said frame, said engine including a drive motor supported centrally by said frame, a cover over said engine, motor driven drive means connected to drive said axled wheels, and steering means connected to steer said wheels, said bow chassis including forward floor means above said frame with the steering wheel of said steering means extending thereabove, a driver's seat supported on one side above said floor means to the rear of said steering wheel, said trailer home also including a housekeeping portion comprising a rear whee'ed axle means and a rear frame including means providing rear journal means for said rear wheeled axle means whereby said rear wheeled axle means journally supports said rear frame, a main chassis supported by said rear frame, said main chassis including a single level main floor lower than said bow chassis floor means, housekeeping accouterments supported by said main floor, and access means into said main chassis and onto said main floor, said forward portion and said housekeeping portion being separately fabricated, and said trailer home including means connecting said portions in open space communicating, assembled relation.

2. The combination as claimed in claim 1 in which said housekeeping portion including a transverse division wall dividing said main chassis rearwardly into a bedroom, with a door in the wall on one side and a bathroom disposed forwardly thereof on the opposite side, said main chassis forward of said wall also providing kitchen and living room space.

3. The combination as claimed in claim 1 in which said rear wheeled axle means comprises a pair of opposed whee's supporting a rear axle journalled in said rear frame as aforesaid.

4. The combination as claimed in claim 1 in which said rear wheeled axle means comprises a tandem unit.

5. The combination as claimed in claim 1 in which said access means includes a door through a side of said main chassis adjacent said forward floor means, and a door through the rear end of said main chassis, centrally thereof.

6. The combination as claimed in claim 1 in which said forward frame and said rear frame each comprise substantially equally transversely spaced apart longitudinally extending members, and in which said means connecting said portions includes means to connect respectively abutting longitudinal members.

7. The combination as claimed in claim 1 in which said engine cover comprises a table top, in which said driver's seat is swiveled, and in which a swiveled seat is provided above said floor means opposite said engine from said driver's seat, whereby said seats may be swiveled toward said table.

8. The combination as c'aimed in claim 1 in which said steering wheel may extend upwardly from said floor means at angles ranging from the vertical to substantially twenty degrees rearwardly.

9. The combination as claimed in claim 1 in which said steering wheel extends upwardly from said floor means at an angle from the vertical of substantially twelve degrees rearwardly.

10. The combination as claimed in claim 1 in which said main floor provides fuel, sewage, and water compartments therebeneath.

References Cited

UNITED STATES PATENTS

| | | | |
|---|---|---|---|
| 2,577,836 | 12/1951 | Willson | 296—23 |
| 2,941,836 | 6/1960 | Lewis | 296—23 |
| 3,000,455 | 9/1961 | Mayfield | 180—12 |
| 3,157,427 | 11/1964 | Reynolds | 296—23 |
| 3,165,350 | 1/1965 | Willson | 296—23 |
| 2,480,047 | 8/1949 | Reinhard | 180—12 |

FOREIGN PATENTS

| | | |
|---|---|---|
| 297,881 | 10/1928 | Great Britain. |
| 935,576 | 8/1963 | Great Britain. |

KENNETH H. BETTS, *Primary Examiner.*

U.S. Cl. X.R.

296—23